Figure 3:
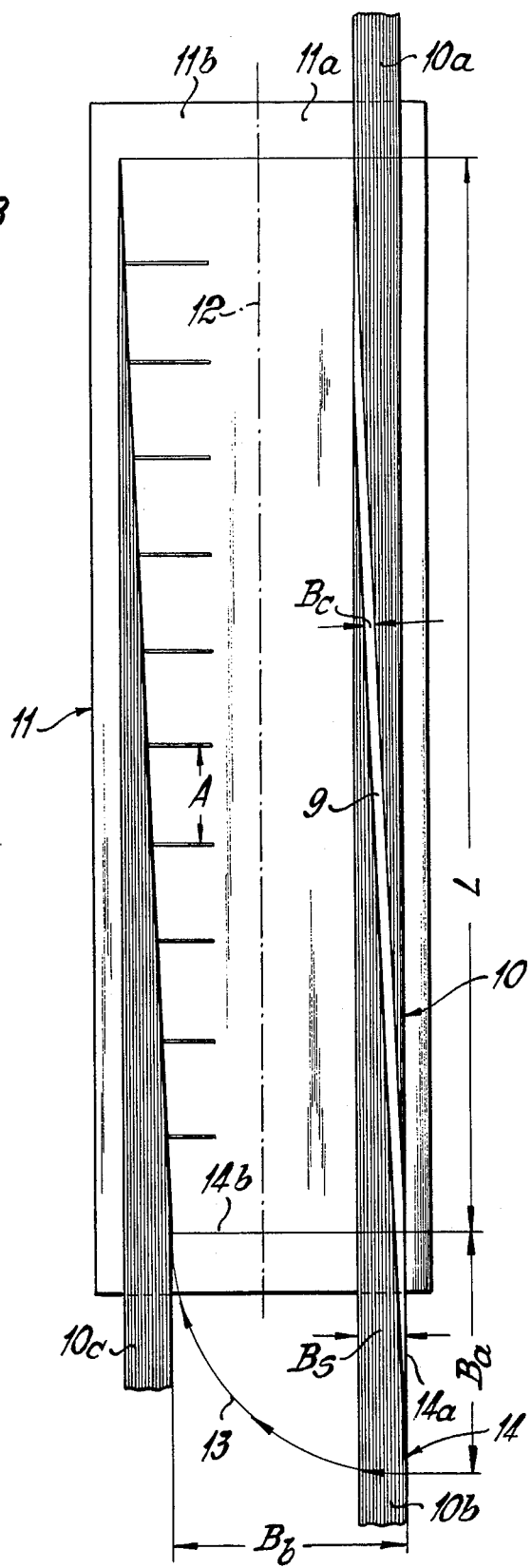

United States Patent
Aurenz

[11] 3,909,109
[45] Sept. 30, 1975

[54] OPTICAL FIBER IMAGE MAGNIFYING APPARATUS

[75] Inventor: Hans-Dieter Aurenz, Mainz, Germany

[73] Assignee: Jenaer Glaswerk Schott & Gen., Mainz, Germany

[22] Filed: Oct. 29, 1974

[21] Appl. No.: 518,528

Related U.S. Application Data
[63] Continuation of Ser. No. 278,827, Aug. 8, 1972, abandoned.

[30] Foreign Application Priority Data
Aug. 9, 1971  Germany.............................. 2139827

[52] U.S. Cl. .................................. 350/96 B; 355/1
[51] Int. Cl.² ............................................ G02B 5/16
[58] Field of Search ................................ 350/96 B; 313/372–475; 355/1

[56] References Cited
UNITED STATES PATENTS
| | | | |
|---|---|---|---|
| 2,354,591 | 7/1944 | Goldsmith...................... | 350/96 B X |
| 2,825,260 | 3/1958 | O'Brien.............................. | 350/96 B |
| 3,038,959 | 6/1962 | Beurle.......................... | 350/96 B X |
| 3,043,179 | 7/1962 | Dunn................................. | 350/96 B |
| 3,043,910 | 7/1962 | Hicks ............................. | 350/96 B X |
| 3,402,000 | 9/1968 | Crawford ......................... | 350/96 B |
| 3,509,561 | 4/1970 | Moore et al................... | 350/96 B X |
| 3,658,407 | 4/1972 | Kitano et al...................... | 350/96 B |
| 3,680,948 | 8/1972 | Sussman et al................... | 350/96 B |

FOREIGN PATENTS OR APPLICATIONS
| | | | |
|---|---|---|---|
| 1,512,126 | 4/1970 | Germany........................... | 350/96 B |
| 285,738 | 2/1928 | United Kingdom............... | 350/96 B |

*Primary Examiner*—David H. Rubin
*Attorney, Agent, or Firm*—David R. Murphy

[57] ABSTRACT

An image magnifying apparatus comprising a bundle comprising a plurality of optical fibers, said bundle having an image inlet end and an image outlet end wherein the fibers are spaced further apart than they are at the image inlet end, and a dispersion plate placed perpendicular to the fibers at the image outlet end wherein the distance of the viewing surface of the dispersion plate from the image outlet end of the bundle is such that adjacent cones of light emitted from fibers of the bundle just touch on the viewing surface.

2 Claims, 3 Drawing Figures

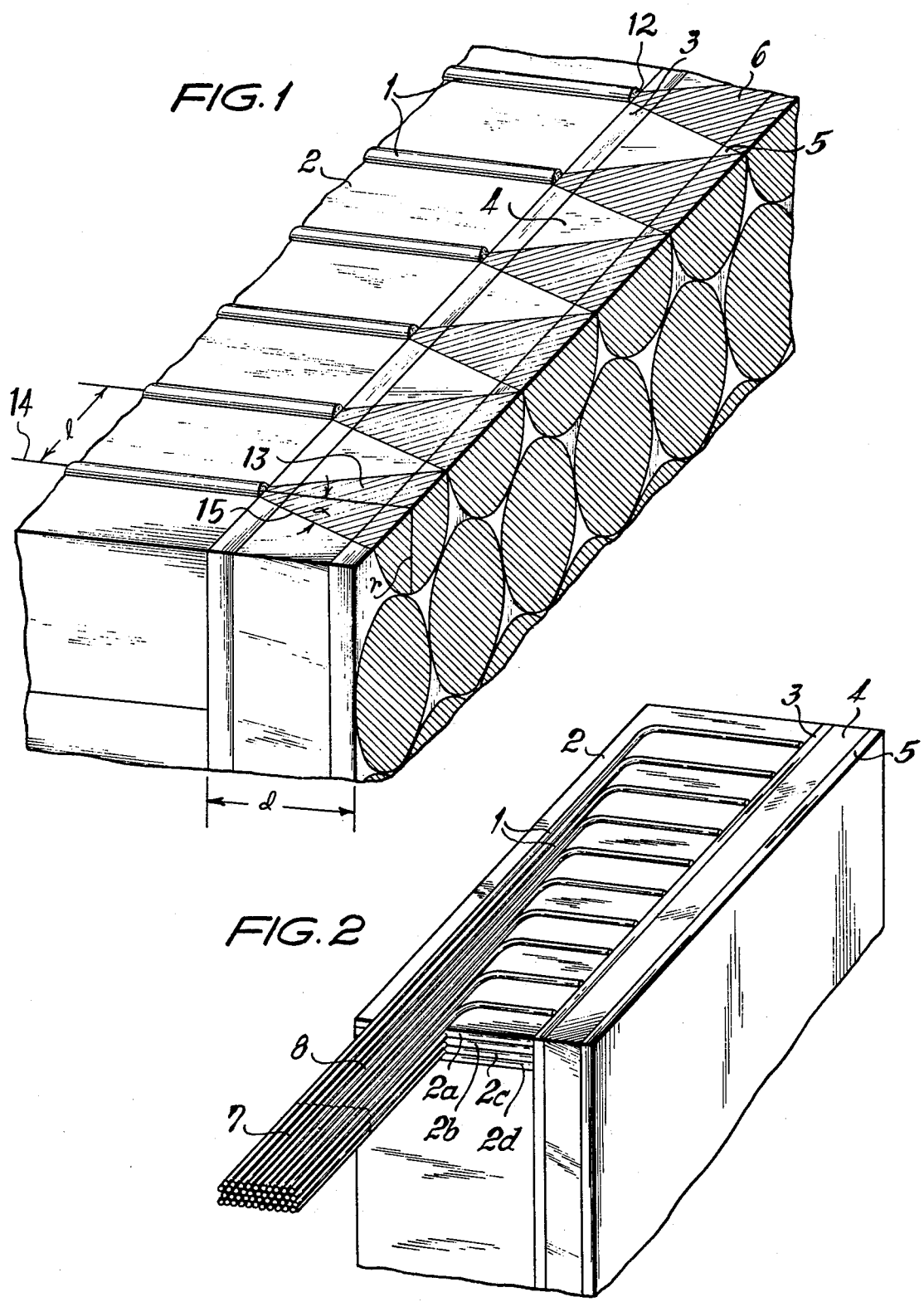

OPTICAL FIBER IMAGE MAGNIFYING APPARATUS

This application is a continuation of U.S. Pat. application Ser. No. 278,827 filed in the U.S. Patent Office on Aug. 8, 1972, now abandoned.

The invention relates to an apparatus with which images could be transmitted with constant magnification. The apparatus is characterized in that a plurality of juxtaposed, light-conducting fibers are tightly packed to form a block at the light-inlet end of the apparatus and these fibers are spread out fanwise at the outlet end, and a dispersion disc or plate is arranged at such a distance from the common plane of the spread-out ends of the light-conducting fibers that light intensities of image elements introduced at the inlet end produce at the outlet end a magnified or enlarged copy of the introduced image on the said dispersion disc, because of the natural, conical radiation characteristic of light-conducting fibers.

It has already been proposed to bunch light-conductive fibers on the one side of an image-transmission arrangement into a closed fiber block end to allow them to terminate on the other side in thickened ends, which likewise form a closed fiber block and hence an enlarged image-reproduction surface (German Offenlegungsschrift No. 1 512 126). See also O'-Brien U.S. Pat. No. 2,825,260. This proposal does, however, encounter technical difficulties which in practice are almost impossible to overcome, because it involved an enormous expense to produce innumerable juxtaposed light-conducting fibers with thickenings at one end.

The present invention overcomes the difficulties of this known proposal, by making use of the natural conical radiation characteristic of light-conducting fibers and providing a dispersing disc or plate at the position at which the outlet cone from the light-conducting fibers merge into a fully illuminated surface, the image elements introduced into the light-conducting fibers appearing on the said disc or plate as an enlarged image.

According to the present invention, there is provided an image magnifying apparatus comprising a bundle of a plurality of optical fibers. The bundle has an image inlet end and an image outlet end. In the image outlet end the fibers are spaced further apart than they are at the image inlet end, thereby magnifying any image incident upon the image inlet end of the bundle. The image magnifying apparatus further comprises a dispersion plate placed perpendicular to the fibers at the image outlet end. According to the present invention, the distance between the viewing surface of the dispersion plate from the image outlet end of the bundle is such that adjacent cones of light emitted from the fibers of the bundle just touch on the viewing surface of the dispersion plate. This is preferably accomplished by a mathematical relationship explained below with respect to FIG. 1.

According to another feature of the present invention, there is provided an image magnifying apparatus wherein the fibers are of uniform cross-section, thus alleviating a serious construction problem attendant upon the production of fibers of increasing cross-section as disclosed in O'Brien supra. According to the present invention, in the image inlet end the fibers are parallel to one another, and each fiber is in contact with adjacent fibers. In the image outlet end, the fibers are also parallel to one another. Furthermore, the distance between any two adjacent fibers is greater than the distance between these two fibers at the image inlet end. The ratio of these distances is, of course, equal to the magnification created by the apparatus. Furthermore, in the image outlet end, the distance between any two adjacent fibers is equal to the distance between any other two adjacent fibers in order to ensure distortion-free enlargement of any image incident upon the image inlet end. Between the image inlet end and the image outlet end is an intermediate section wherein each fiber is bent in the same direction at the same angle, and preferably at right angles. This structure avoids the onerous alignment of diverging fibers each at a different angle, as shown for example in FIG. 7 of Hicks et al. U.S. Pat. No. 2,992,587.

The design in principle of the apparatus according to the invention is shown diagrammatically in the drawing.

In an apparatus according to FIG. 1, light-conducting fibers lie embedded between thin plates 2 consisting of synthetic plastics materials. The fibers end approximately in the plane between the plates 2 and a light-transmissive and at least periodically plastic medium 3. Situated before the latter is a likewise light-transmissive support plate 4 of selective refractive index, which is followed by a thin dispersion plate 5 which advantageously has an incompletely dispersing character.

The light emerging from the separate fibers 1 can spread out through the media 3, 4 and 5 in its natural conical form 6 and be visible to the viewer on the dispersion plate 5.

The object of the medium 3 in this case is to compensate for the discontinuities which are formed with the surface machining of the plates 2 of synthetic plastics material which are stacked one upon the other. Consequently, it is at least periodically plastic adaptive. It is possible to use it for an adhesive effect between the parts 2 and 4.

The thickness of the plate 4 is so chosen that the light cone emerging from the separate fibers 1 forms an image with arbitrary and desired approximation or overlap on the dispersion plate 5.

As can be seen by reference to FIG. 1, the distance $d$ of the viewing surface 11 of the dispersion plate 4 from the image outlet end 12 of the fiber 1 is such that $r/d = \tan \alpha$. As shown in FIG. 1, $r$ is the radius of the cone 13 of light on the viewing surface 11 of the dispersion plate 4. The angle $\alpha$ is measured within the dispersion plate 4 between the centerline 14 of the fiber 1 and the outermost ray 15 emitted by that fiber. In the embodiment shown, the thickness $d$ of the dispersion plate is such that $r = \frac{1}{2} l$, wherein $l$ is the distance between centerlines of adjacent fibers at the image outlet end. Selection of specific materials for use as dispersion plates in accordance with the present invention is well within the skill of the art, taking into consideration such factors as the refractive index of the dispersion plate and whether or not the dispersion plate is separated from the image outlet end by a spacer 3 which may be an air gap.

According to FIG. 2, the complete apparatus is thus composed of an entry block 7 in which the light-conducting fibers in the form of a bundle (V-packing) and in the required number are tightly connected to one another by means of a sheathing or a material which fills the cavities, a following zone 8 in which the fibers need not have any sense of order, and another zone in which each line of fibers opens out on a synthetic plastic plate 2 (2a to 2d for the separate lines), along which the fibers extend, the individual fibers successively deflecting at a defined interval in the direction of the components medium 3 to dispersion plate 5.

The fixed magnification factor of the complete arrangement is determined in the horizontal direction by the ratio between the axial spacings of the separate fibers in the inlet block 7 and the axial spacings of the fibers on reaching the medium 3.

The magnification or enlargement factor in the vertical direction is established by the vertical projection of the axial spacings in the inlet block 7 to the vertical axial spacings of the lines between the plastic plates 2. The two factors are advantageously chosen to be of the same value.

In order to compensate for the unequal lengths of the separate fibers and thus of the unequal light absorption, a suitably adapted gray filter is placed before the inlet block, where this effect cannot already be compensated for at the time of producing the image.

One possible process by which the apparatus according to the invention can be produced is hereinafter described with reference to FIGS. 2 and 3.

A single-layer band 10 of fibers with the width $B_a$ of the entry block 7 (light inlet) is wound tightly on a drum (circumference of required maximum length) and the fibers are stuck together by a light-sensitive lacquer.

The band is cut and the middle thereof (or a chosen position) is placed beneath a diaphragm with an oblique slot. The two ends 10a and 10b then hang out on both sides.

The band is exposed to light with the diaphragm having the oblique slot. The diaphragm is so adjusted that the slot makes available for exposure the zone 9 of the band.

The slot (and therefore the zone 9) has for the fiber direction such an angle that the $ctg\ \alpha = (L/B_s)$ corresponds to the required scale of enlargement of the image. ($L$ = length of the slot; $BS$ — width of the band).

The slot has such a width Bc that each separate fiber is exposed in a length $B_a$ of a few centimeters.

After the rinsing, each fiber is no longer stuck to the adjoining fiber over the length indicated by $B_a$.

The two ends (10a, 10b) of the band which have not been exposed to light and consequently are still stuck together, are so moved relatively to one another that the end 10b comes into the position indicated by 10c. The swivelling movement is indicated by the arc 13 in respect of the individual fiber 14 disposed furthest towards the left. The position 14a is before and 14b after the swivelling movement. The fibers are thus deflected from their previous position by 90° in the zone 9 freed from the adhering lacquer. They then have in the central region a spacing A from one another, which corresponds to the required screen dimension.

In the middle zone, the fibers are laid or stuck on to a synthetic plastic strip 11 having approximately the thickness of the required vertical line spacing. The strip may have an additional embossing, so as clearly to define the position of the fibers. The strip can be sufficiently wide for it still to cover the wedge-shaped ends of 10a and 10c.

The strip 11 can also consist of two parts of preferably equal dimensions and which are half as thick, between which parts the fibers are laid in sandwich form.

The synthetic plastic strip 11 is separated along its longitudinal axis 12 into two parts 11a and 11b, each part corresponding to a part 2 of FIG. 2.

Consequently, from one strip 10, there are formed two lines, consisting of the part 11a ( = 2), the fibers 10a which are disposed thereon ( = 1), a line of the exposed portion 8 and of the entry block 7.

A corresponding number of lines are stacked one upon the other and fixed in position at the entry block 7. Bands of unequal length may possibly be used in order to reduce the necessary quantity of glass.

By introducing a thin light band (perpendicular to the position of the separate lines) in the entry block 7 and by observing the light emerging from the ends of the fibers, the individual layers of the plastic strip (2) ( = 11) can easily be so displaced relative to one another that one line is formed and thus the geometry is in conformity.

The plastic strips are fixed relatively to one another by a binder or by corresponding treatment. In this way, the actual image screen is formed.

When necessary, the image screen is surface-ground.

The light-transmissive medium 3 is applied to the image screen in a state of lowest possible viscosity. The natural surface tension produces a sufficiently plane surface.

The image screen is applied to the glass plate 4.

The dispersion plate 5 is applied.

The thickness of the light-conducting fibers to be used can be arbitrarily chosen within a relatively wide range and a preferred thickness is in the region of 40 microns. The number of the fibers depends on the resolution which is desired. For transmitting television images, a number of about 800 × 700 fibers is preferred. In principle, the enlargement factor can be freely chosen and is adapted to the established requirements. Under the conditions as set forth, there is for example produced with:

a. entry block: 800 × 700 fibers in a V-packing, diameter =40 microns, corresponding to an active surface of 32 × 24 mm, and b. image-forming block: 800 × 600 mm, corresponding to 1,000 mm diagonally, an enlargement factor of 25.

The entry block 7 is either sheathed in a dimensionally stable manner or stuck together after suitable impregnation. The image-forming block of the separate synthetic plastics plates is adhesively bonded by suitable (e.g., thermal) treatment or is likewise impregnated with adhesives.

Any suitable solid, liquid or gaseous material can be used for the light-transmissive medium 3.

The medium 3 is to avoid difficulties with the polishing of the plate 2, by the fact that it is adapted, in liquid (or plastic) phase, to the surface of 2.

The light-transmissive plate preferably consists of glass, because it can be selected with the required refractive index.

The dispersion plate 5 is to be as thin as possible and resistant to ambient influence. Since it does not have to satisfy any standards as regards precision, it can be made removable and replaceable and at least washable.

The dispersion disc is "incompletely" to disperse light.

Colored light can also be irradiated into the fibers. Where the absorption characteristic of the fibers is not neutral as regards color, this can be compensated for by a suitable color filter before the entry block 7.

When using the invention in the television field, a light beam modulated with a television video signal, deflected optically in the image and line direction by methods known per se, can be introduced into the fiber block. Three separate light beams in the normal three primary colors used in color television can likewise be added and introduced into the fiber block after suitable modulation and deflection. Other types of cathode ray tubes can also be employed.

For the reproduction of transparencies and film images, the image of a still or motion picture projector can be introduced into the fiber block.

Although the invention has been described in considerable detail with reference to certain preferred embodiments thereof, it will be understood that variations and modifications can be effected within the spirit and scope of the invention as described above and as defined in the appended claims.

What is claimed is:
1. An image magnifying apparatus comprising:
A. a bundle comprising a plurality of optical fibers of uniform cross-section, said bundle having:
  1. an image inlet end for receiving an image as a plurality of image elements wherein:
    a. the fibers are parallel to one another,
    b. each fiber is in contact with adjacent fibers,
    c. each fiber received only one element of the image,
  2. an image outlet end wherein:
    a. the fibers are parallel to one another,
    b. the distance between any two adjacent fibers is greater than the distance between these two fibers at the image inlet end,
    c. the distance between any two adjacent fibers is equal to the distance between any other two adjacent fibers,
    d. the ratio of the distance between any two fibers at the image outlet end to the distance between the same two fibers at the image inlet end is the same for any two fibers of the bundle and is equal to the magnification created by the apparatus,
    e. the spatial relationship between adjacent fibers is the same as at the image inlet end,
  3. an intermediate section between the image inlet end and the image outlet end wherein:
    a. each fiber is bent the same direction at the same angle,
    b. each fiber is of uniform cross-section,
B. a dispersion plate placed substantially perpendicular to the fibers at the image outlet end the dispersion plate being spaced from the image outlet end by a light-transmissive and at least periodically plastically adaptive medium fixed to the image outlet end of the fibers for compensating for any discontinuities present in the image outlet end, and a likewise light-transmissive support plate fixed to the periodically plasticly adaptive medium and to the dispersion plate for supporting the dispersion plate at a preselected distance from the image outlet end,
  1. the distance of the viewing surface of the dispersion plate from the image outlet end of the bundle is such that adjacent cones of light emitted from fibers of the bundle just touch or overlap on the viewing surface.

2. An image magnifying apparatus comprising:
A. a bundle comprising a plurality of optical fibers of uniform cross-section, said bundle having:
  1. an image inlet end for receiving an image as a plurality of image elements wherein:
    a. the fibers are parallel to one another,
    b. each fiber is in contact with adjacent fibers,
    c. each fiber received only one element of the image,
  2. an image outlet end wherein:
    a. the fibers are parallel to one another,
    b. the distance between any two adjacent fibers is greater than the distance between these two fibers at the image inlet end,
    c. the distance between any two adjacent fibers is equal to the distance between any other two adjacent fibers,
    d. the ratio of the distance between any two fibers at the image outlet end to the distance between the same two fibers at the image inlet end is the same for any two fibers of the bundles and is equal to the magnification created by the apparatus,
    e. the spatial relationship between adjacent fibers is the same as at the image inlet end,
  3. an intermediate section between the image inlet end and the image outlet end wherein each fiber is of uniform cross-section, the intermediate section comprising:
    a. a first zone wherein the fibers need not be in any particular order, and
    b. a second zone wherein the fibers are arranged into layers, each layer of fibers extending along a surface of a plate in a first selected direction, the individual fibers in each layer being initially parallel and successively deflecting at the same angle and at at defined interval from the first selected direction to a direction perpendicular to an edge of the plate, the fibers terminating at the edge of the plate thereby forming the image outlet end, and
B. a dispersion plate placed substantially perpendicular to the fibers at the image outlet end, the dispersion plate being spaced from the image outlet end by a light-transmissive and at least periodically plasticly adaptive medium fixed to the image outlet end of the fibers for compensating for any discontinuities present in the image outlet end, and a likewise light-transmissive support plate fixed to the periodically plastically adaptive medium and to the dispersion plate for supporting the dispersion plate at a preselected distance from the image outlet end, wherein:
  1. the distance of the viewing surface of the dispersion plate from the image outlet end of the bundle is such that adjacent cones of light emitted from fibers of the bundle just touch or overlap on the viewing surface.

* * * * *